June 2, 1942.  R. J. MONTGOMERY  2,285,167
WIRE STRIPPER
Filed Sept. 12, 1940  3 Sheets-Sheet 1
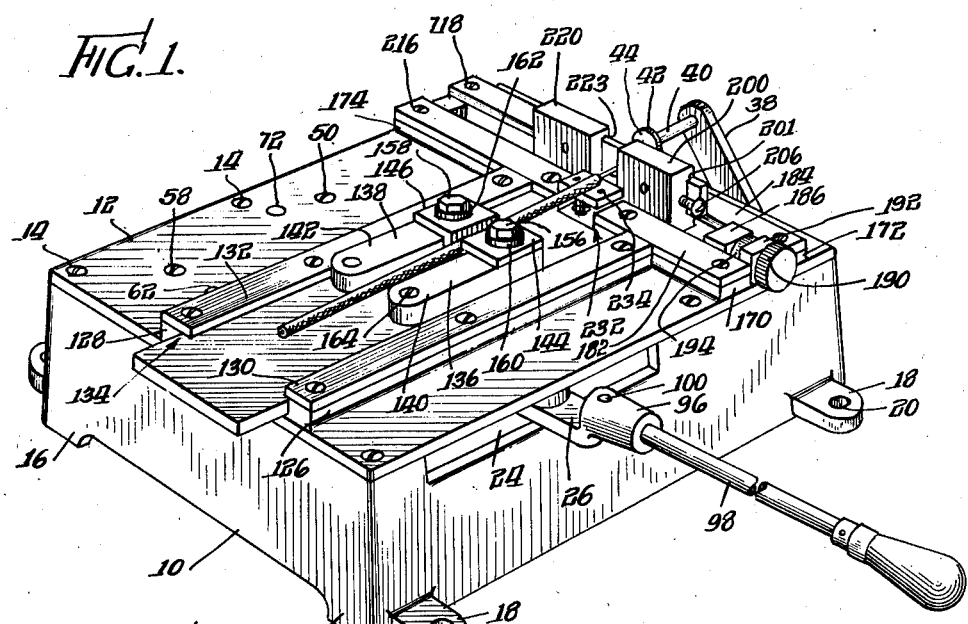
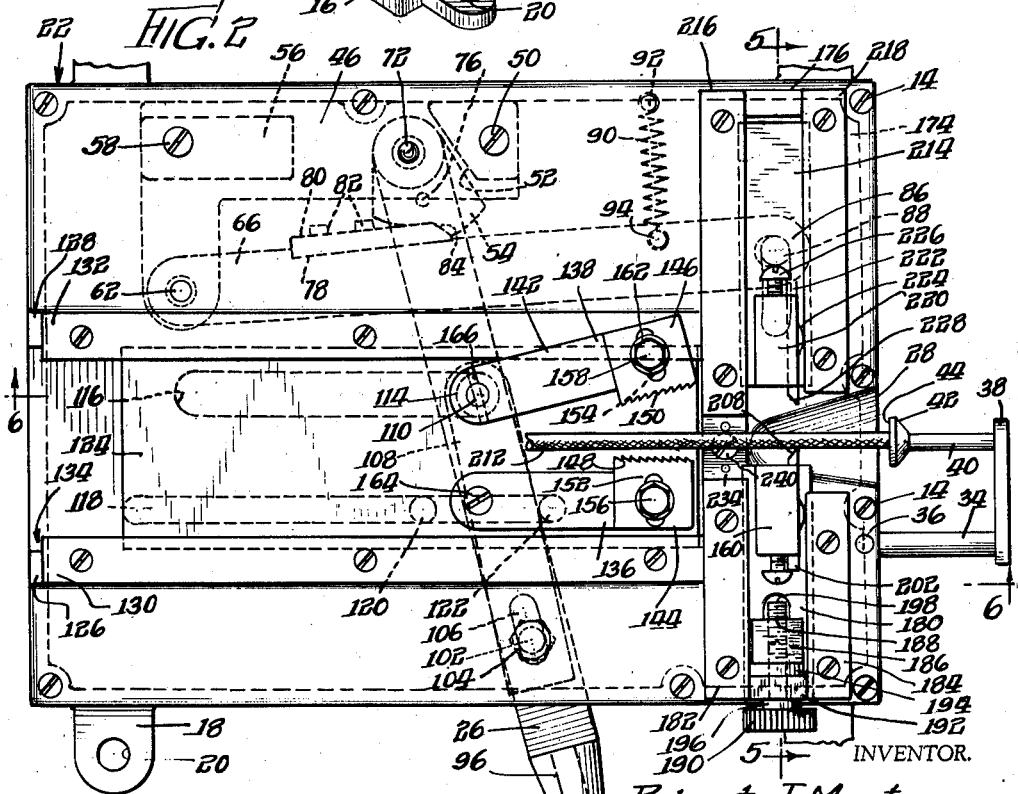
INVENTOR.
Robert J. Montgomery
By:- Cox Moore & Olson
attys.

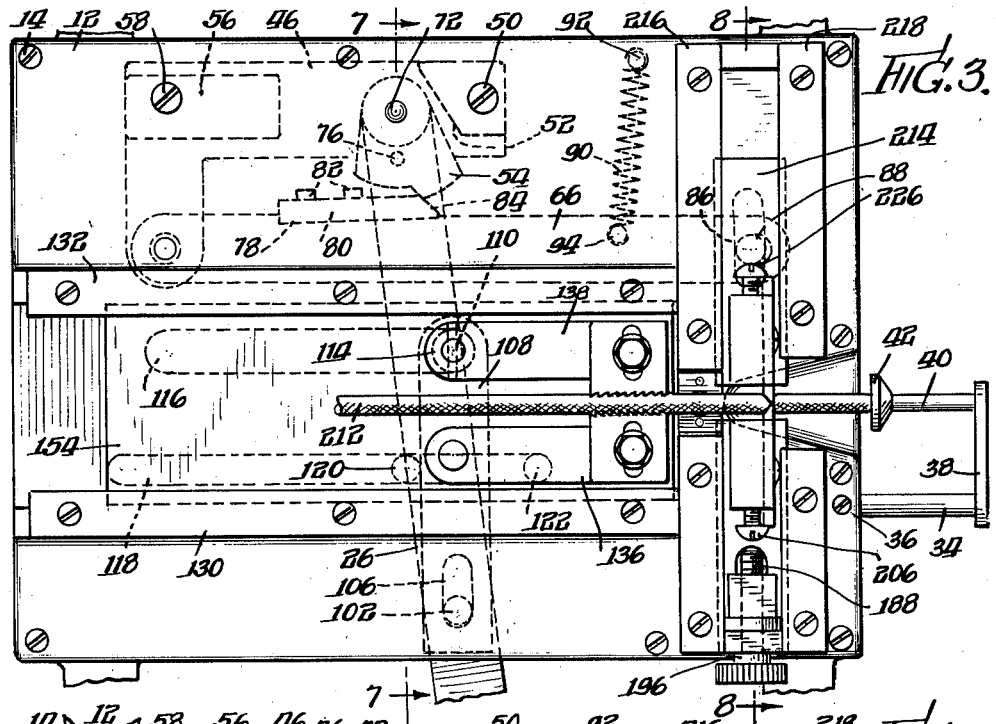
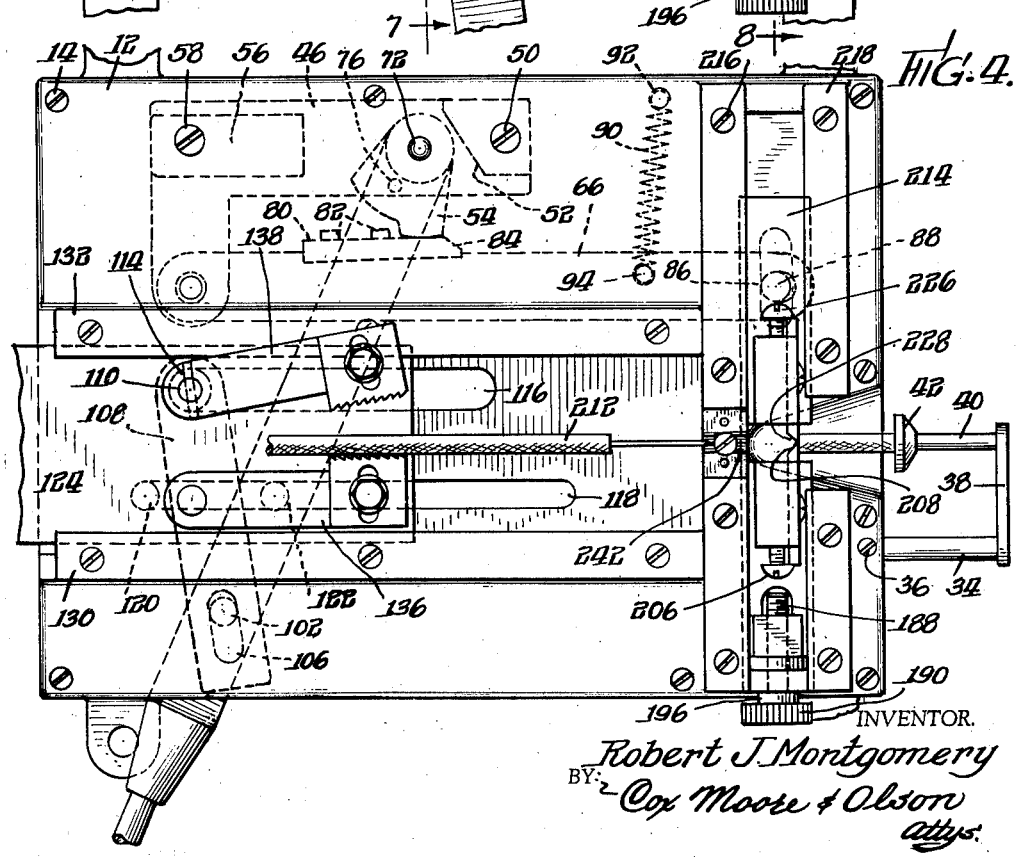

June 2, 1942. R. J. MONTGOMERY 2,285,167
WIRE STRIPPER
Filed Sept. 12, 1940 3 Sheets-Sheet 3
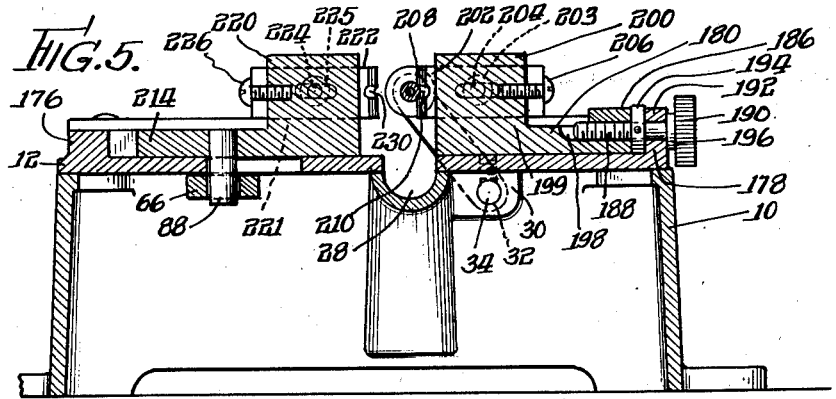
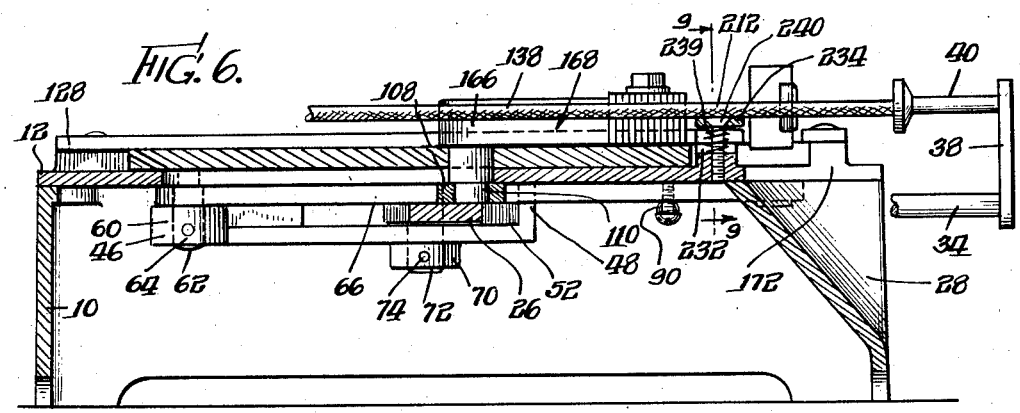
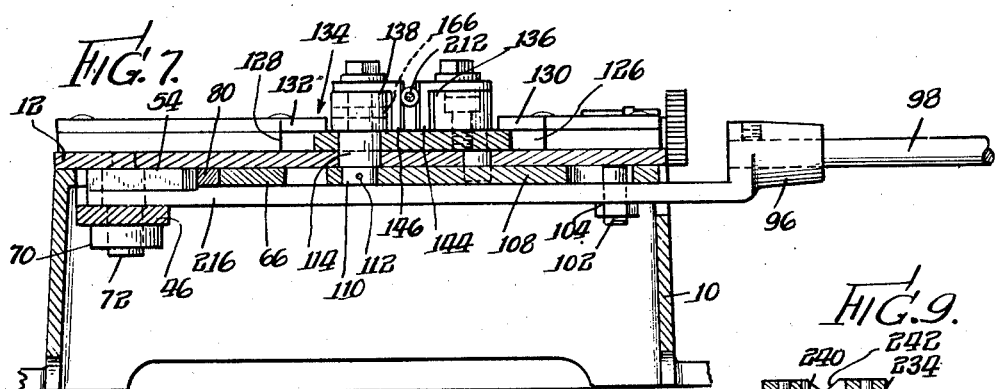
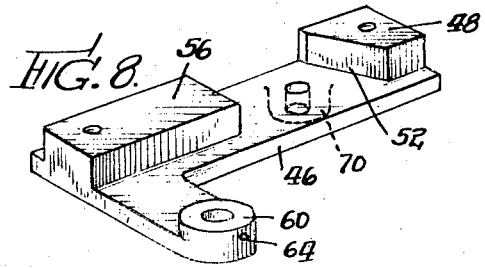
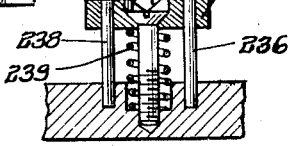
INVENTOR.
Robert J. Montgomery
By Cox Moore & Olson
attys.

Patented June 2, 1942

2,285,167

UNITED STATES PATENT OFFICE 2,285,167

WIRE STRIPPER

Robert J. Montgomery, Chicago, Ill.

Application September 12, 1940, Serial No. 356,494

13 Claims. (Cl. 81—9.51)

This invention relates to cutting and stripping devices. More particularly, it relates to a device for stripping insulation from electrical conductors.

Although devices are known in the art for stripping insulation from electrical conductors, as, for example, when a bare section of a conductor is required in order to make a connection, they are subject to certain disadvantages. Thus, many are satisfactory where they are not subject to heavy use even though, due to their manner of operation, they are not suited to heavy, continuous use. Others leave the conductor after stripping in a distorted shape and make it necessary to straighten it before use. Still others are highly efficient in operation but are so complicated and expensive as to preclude their use in many instances.

It is, therefore, an object of this invention to provide an improved device for stripping covering material from electrical conductors.

A further object is to provide a device for removing insulation from electrical conductors which is adapted for heavy and continuous use.

Another object is to provide a stripper for stripping insulation from electric wire which is adapted to remove a portion of the insulation without marring the wire or distorting it out of shape.

Still another object is to provide a stripper for electric wire which is adapted to strip a variable portion of the insulation from wire, whether the wire be heavy, medium or light in size.

A still further object is to provide a wire stripper which operates rapidly and easily and thus facilitates quick and complete stripping of large quantities of wire.

Another object is to provide a simple and inexpensive wire stripper which is at the same time strong and durable and thus adapted for heavy use.

It is also an object of the invention to provide a wire stripper of the latter type which is readily adjustable for varying sizes of wire and for stripping varying lengths of insulation.

Other objects will appear hereinafter.

The manner in which these objects are accomplished will become more apparent from a consideration of the attached drawings which form a part of this specification and in which Figure 1 is a view in perspective of a wire stripper embodying this invention;

Figure 2 is a detail plan view showing the stripper in its initial position with a wire inserted for stripping;

Figure 3 is a view similar to Figure 2, showing the parts in the position they occupy when the stripper is at an intermediate point in its cycle of operation;

Fig. 4 is another view similar to Figures 2 and 3, showing the positions occupied by the parts of the stripper after the wire has been stripped and is ready for removal;

Figure 5 is a detailed vertical section on the line 5—5 in Figure 2;

Figure 6 is a detailed vertical section on the line 6—6 in Figure 2;

Figure 7 is a detailed vertical section on the line 7—7 in Figure 3;

Figure 8 is a view in perspective of an L-shaped member which is attached to the under face of the cover; and Figure 9 is a fragmentary vertical section on the line 9—9 in Figure 6.

Referring now to the drawings in more detail, it is seen that the device comprises a hollow base 10 provided with a cover 12 and secured thereto by screws 14. Foot portions 16 are provided at each corner of the base and have associated with them lugs 18 provided with openings 20 adapted to receive fastener units for securing the device to a support. Suitable lugs or projections are formed, as at 22, on the upper surface of the base 10 to receive the screws 14.

A rectangular opening 24 is provided near the upper edge of one side of the base through which the end of lever 26, which is secured to cover 12, extends. The base is also provided at its front end with a chute 28 formed integrally therewith and extending from a point spaced inwardly from the outer edge of the base 10 and about on a level with its upper surface down to a point near the bottom of the base 10 at the front end thereof.

It will be noted that chute 28 is located nearer to one side of the base than to the other. Adjacent chute 28 and between it and the nearer side of the base an enlarged portion 30 having a horizontal opening 32 therethrough is provided. Extending in opening 32 from the outside of base 10 to the inside is a rod 34 which is slidable and turnable in the opening 32. A set screw 36, to which access may be had through a suitable opening in the cover 12, is arranged to secure rod 34 in any position to which it may be adjusted. A link 38 is rigidly secured to the outer end of rod 34 and in turn has another rod 40 rigidly secured to its opposite end. The other end of rod 40 has secured to it a circular cap 42 having a flat face 44. The purpose of cap 42 will become more apparent hereinafter.

The main portion of the operating mechanism of the stripper is mounted on the cover 12. Adjacent a rear corner of the cover 12, on the under side, a generally L-shaped member 46 is provided. At the extremity of the long arm of L-shaped member 46 a vertically extending portion 48, integral with member 46, is provided. This member 48 serves to space L-shaped member 46 below the bottom surface of the cover 12 and is secured to the cover 12 by a screw 50 whereby it supports one end of member 46.

One vertical face 52 of the member 48 is set at an angle with all four edges of the cover 12 to provide a stop for cam portion 54. Near the angle in the L-shaped member 46 another vertically extending portion 56 is provided which is also integral with member 46. Portion 56, which has a generally rectangular horizontal cross-section, also serves the double purpose of spacing the L-shaped member 46 from the lower face of cover 12 and securing it thereto, screw 58 serving to hold portion 56 to the cover 12.

The end of the short arm of the L-shaped member 46 is curved and has formed on it between the L-shaped member and the lower face of the cover a disk-like part 60. Extending vertically through the center of this disk-like part 60 and through the end of the short arm of L-shaped member 46 is an opening in which a pivot 62 is mounted. This pivot extends up into an aligned opening in the cover 12. Pivot 62 is secured against rotation by a set screw 64 mounted in the end of the short arm of L-shaped member 46. Turning on this pivot 62 is a long, knife operating arm 66.

On the long arm of member 46, at a point about midway between portions 48 and 56, another disk-like portion 70 is provided on the under face of portion 46. Mounted in a vertical opening extending centrally through disk 70 and through L-shaped member 46 is a pivot 72. A set screw 74 secures this pivot against rotation. The other end of pivot 72 is received in an opening in cover 12 which is aligned with the opening in disk 70.

Mounted to turn on pivot 70 is the inner end of lever 26. Between lever 26 and the lower face of cover 12 cam 54 is also mounted on pivot 72. Lever 26 rests in a slot in the face of cam 54 and is rigidly secured to cam 54 by a rivet 76. Cam 54 thus turns with lever 26.

Along one side of knife operating arm 66 adjacent cam 54 a notch 78 receives a small bar 80. Bar 80 is secured to arm 66 by screws 82. The forward end 84 of bar 80 is beveled to cooperate with cam 54. Knife operating arm 66 extends from pivot 62 lengthwise of the cover to a point near the forward end of the device. At its forward end it is provided with an elongated opening 86 in which a pin 88 is loosely received. A coil spring 90, secured at one end to the cover 12 by a fastener 92 and at the other end to arm 66 by a fastener 94, normally urges the arm 66 in a direction away from the center of the stripping device.

Returning now to the lever 26, it is seen that it extends from the pivot 72 out through the opening 24 and terminates in a handle receiving portion 96 in which a handle 98 is inserted. Set screw 100 serves to hold the handle 98 in place. Threaded into a vertical opening located adjacent the end of lever 26, upon which handle receiving portion 96 is formed, is a pin 102. A nut 104 on the lower side of lever 26 firmly secures the pin 102 in place. Pin 102 extends up into an elongated slot 106 in link 108. Pin 102 is freely slidable in the slot 106 and does not extend up through cover 12.

At the end of link 108 opposite to that in which slot 106 is located a vertically extending pin 110 is rigidly secured by a key 112. Mounted on pin 110 on the upper side of link 108 is a spacing collar 114. The pin 110 and the spacing collar 114 extend up through a longitudinal slot 116 in the cover 12. Parallel to the slot 116 is a narrower slot 118 in the cover 12, although a single wider slot may be provided instead of these two. Such wider slot would have the same length as slot 116 and a width equal to the distance between the outer edges of slots 116 and 118. Slot 116 is provided to permit longitudinal movement of collar 114 and pin 110. The narrower slot 118 receives pins 120 and 122 for longitudinal movement. These two pins 120 and 122 are rigidly attached to a plate 124 slidably mounted on the upper face of cover 12 and extend below cover 12 a distance sufficient to permit them to engage link 108 but not far enough to engage lever 26.

It will be noted that these pins 120 and 122 are placed on either side of link 108 but are spaced apart a distance somewhat greater than the width of link 108, whereby some free movement of link 108 between them is permitted. The forward pin 122 is generally circular in shape but is flattened on the sides where it is in contact with the sides of the slot 118. Pin 120, on the other hand, is also generally circular in shape but is somewhat smaller and is flattened only where it comes in contact with link 108. The spacing of pin 120 with respect to pin 122 may be varied somewhat or pin 120 may be omitted. These variations are described more fully hereinafter.

Turning now to the upper face of cover 12, it is seen that the long rectangular plate 124, to which reference has already been made, is arranged to slide in a channel which is parallel with the long sides of the cover 12 but is located somewhat nearer the side on which the lever 26 projects from the base. The channel is formed by two parallel, raised portions 126 and 128 extending lengthwise of the cover 12 and rigidly secured thereto. The raised portions 126 and 128 may be cast integrally with the cover or may be formed separately and secured thereto by suitable dowel pins (not shown) or by welding, or both, or any other suitable means.

Mounted upon the parts 126 and 128, respectively, are bars 130 and 132 which are somewhat wider than portions 126 and 128 and extend over the channel formed between the parts 126 and 128, as indicated at 134. The parts 126 and 128 are thick enough and are spaced apart sufficiently to allow the plate 124 to slide between them. The bars 130 and 132 serve to retain the plate 124 within the channel or guideway in which it slides.

Mounted upon the upper side of plate 124 adjacent the forward end thereof is a pair of gripping members 136 and 138, gripping member 136 being fixed on the plate, and gripping member 138 being mounted for limited turning movement. These gripping members 136 and 138 include, respectively, arms 140 and 142 and toothed portions 144 and 146.

The toothed portions 144 and 146, having teeth 148 and 150 on their opposed vertical faces, are generally L-shaped in cross-section. The horizontal parts of toothed portions 144 and 146 are provided, respectively, with elongated openings 152 and 154. Bolts 156 and 158, respectively, are passed through these openings and into openings in arms 140 and 142, respectively. The elongated openings 152 and 154 are provided to permit adjustment of toothed members 144 and 146 relative to each other. The washers 160 and 162 serve to permit bolts 156 and 158 to be tightened after adjustment without displacing the toothed members 144 and 146. If desired, the means for adjusting the gripping members 136 and 138 may be omitted.

Bolt 156 passes through stationary gripping member 136 and is threaded into an aligned opening in plate 124. Bolt 158, on the other hand, passes only into arm 142 in which it is threaded, since arm 142 must be free to turn with respect to plate 124. Arm 140 of the stationary gripping member 136 is secured at the end opposite to that upon which toothed portion 144 is mounted by a screw 164 threaded into a suitable opening in plate 124. The stationary gripping member 136 is shown as having a shape similar to that of the movable gripping member 138 for purposes of symmetry, but it will be apparent that the toothed portion 144 may be of any desired configuration and may be secured in position with its teeth 148 opposed to the teeth 150 in any desired way.

Pin 110, previously referred to, which is keyed to link 108 on its lower end and extends up through the cover 12, passes through an opening in the plate 124 in which it is free to turn, and thence through an opening in the rear end of arm 142 to which it is keyed by a key 166. It is thus seen that the gripping member 138 turns with the link 108. In order to permit gripping member 138 to pass over the bar 132, it is cut out on its lower side adjacent the bar 132, as indicated by the dotted line at 168 in Figure 6.

Parallel to the forward end of the cover 12 and adjacent thereto, parallel, raised portions 170, 172 and 174 are provided, portion 170 lying adjacent the forward end of portions 126 and 128, and raised portions 172 and 174 lying adjacent the forward end of cover 12 but spaced inwardly therefrom slightly to permit securing means 14, previously described, to be inserted. It will be seen that portion 172 extends from the side of the cover, from which lever 126 projects, over to the chute 28, and that portion 174 extends from the other side of the chute 28 to the other side of the cover 12.

Another raised portion 176 extends between the adjacent outer ends of raised portions 170 and 174. The adjacent outer ends of raised portions 170 and 172 are also joined by a raised portion 178. As was true of portions 126 and 128, portions 170, 172 and 174 may be formed integral with the cover 12 or may be formed separately and suitably secured thereto. Likewise, portions 176 and 178 may be integral with the cover 12 or may be formed separately or, with the portions 170, 172 and 174, may form a single member which is suitably secured to the cover 12.

Referring now more particularly to the portions 170 and 172, it may be seen that they form a channel therebetween in which a rectangular plate 180 is mounted for sliding movement. Bars 182 and 184 are mounted, respectively, on raised portions 170 and 172 and are wider than the raised portions so that they extend in over the channel between the raised portions 170 and 172 and over the plate 180, and thus serve to retain it within the aforesaid channel. At 186 the plate 180 is made thicker by a portion extending up between the bars 182 and 184 so that it may be threaded horizontally to receive an adjusting screw 188 provided with a knurled head 190 to facilitate turning.

Between the upstanding portion 186 on plate 180 and a similar upstanding portion 192 on raised portion 178 a spacing collar 194 is keyed onto screw 188. Screw 188, which passes freely through a smooth opening in portion 192, has a shoulder 196 which rests against the outer vertical side of the portion 192 and positions screw 188 with respect to the cover against being drawn inwardly when it is turned. Collar 194 serves a similar purpose with respect to outward movement of the screw 188. The body of the plate 180 is cut out at 198 to provide free space for the end of the screw 188.

In a slot 199 on the upper face of plate 180 a vertically extending knife holder 200 is mounted and suitably secured thereto at the inner end of plate 180 as by welding or other means. On the forward vertical face of knife holder 200 a knife 202 is mounted in a slot 201. Knife 202 is provided with an elongated opening 203 through which a screw 204 is passed and secured to knife holder 200. This opening 203 in the knife 202 permits it to be adjusted in the slot 201 in a horizontal direction transversely of the cover 12.

Screw 206, which is threaded into the outer end of knife holder 200, has one portion of the under side of the head resting against the outer end of knife 202 and serves as additional adjusting and securing means for knife 202. The cutting edge of knife 202 is beveled as at 208, and near the mid portion vertically of the beveled cutting edge of knife 202 a slot 210, parallel with the beveled cutting edge 208, is provided to receive the wire 212 which is to be stripped.

In the channel between raised portions 174 and 170 another long rectangular plate 214 is mounted for sliding movement, bars 216 and 218 being mounted on top of raised portions 170 and 174 and extending over plate 214 to secure it in the channel between portions 170 and 174.

The pin 88, previously referred to, which extends down through the opening in the forward end of knife operating arm 66, extends upwardly through an elongated transverse slot provided in cover 12, and thence through plate 214 above which the upper end of pin 88 is riveted down to secure it to the plate 214.

Near the inner end of plate 214 a vertically extending knife holder 220, similar to knife holder 200, is mounted in a slot 221 in the plate 214 and suitably secured thereto. Knife 222, identical with knife 202, is fitted in a slot 223 in the vertical forward face of knife holder 220. Knife 222 is also provided with an elongated opening 225 through which screw 224 is passed and threaded into knife holder 220 to secure knife 222 in position, the elongated opening permitting adjustment of the knife 222 in the slot 223 in a horizontal direction transversely of the cover 12. A screw 226, threaded into the outer end of knife holder 220 and having the under side of its head resting against the end of knife 222, serves as adjusting and securing means for the knife 222. The cutting edge of knife 222 is beveled at 228 in a manner similar to knife 202. Near the middle, vertically, of the beveled cutting edge 228 a slot 230 is provided which is similar to slot 210 and fits around the opposite side of the wire 212 to be stripped.

Between the inner ends of bars 182 and 216 the raised portion 170 is cut away at a space 232 in line with the end of the chute 28 and the space between the toothed gripping portions 144 and 146 when they are closed. In this space 232 a small section of bar material 234, similar to that from which bars 182 and 216 are formed, is mounted. Vertical guide pins 236 and 238 on bar 234 are slidably mounted in openings in raised portion 170 and cover 12. Intermediate these guide pin openings another opening extends through raised portion 170 and the cover 12, which said opening is enlarged at its upper end and is threaded at its lower end to receive a screw 240, the head of which fits in a dished out opening on the top of bar 234.

Between the under side of the bar 234 and the bottom of the enlarged portion of said intermediate opening a coil spring 239 is mounted around screw 240 so as to normally force the plate 234 upwardly. By means of this spring and screw arrangement the plate 234 may be adjusted vertically with respect to the cover 12 and serves to position the forward end of the wire 212 between the slots 210 and 230 in the knives 202 and 222. A V-groove 242, centrally located on the upper surface of bar 234, further assists in positioning the wire 212.

The above description of the various parts of the device will be better understood from a consideration of the actual operation of the device in stripping a portion of insulation from an insulated electric wire, such as the wire 212 shown in the drawings. Before proceeding with this description, it is to be noted that the knives 202 and 222 are readily removable so that a variety of knives, having different sized slots 210 and 230, can be provided. By providing such a variety of knives, a single machine is adapted to strip a large number of different sizes of insulated wire.

Having selected suitable knives 202 and 222 and inserted them in position in the machine, the knife 202 is first roughly adjusted to a position where it will just be met by the knife 222, at the innermost end of the movement of knife 222, by adjusting screws 204 and 206. Although knife holders 200 and 220 may be arranged as desired, they are ordinarily positioned and constructed so that the cutting edges of the knives 202 and 222 do not exactly meet but are offset slightly from each other in a direction lengthwise of the cover 12. Although the knife holders 200 and 220 are particularly referred to, such offset arrangement of the knives may also be produced by varying the position of any other of the various parts which determine the position of the knives with respect to each other.

After the rough positioning of the fixed knife 202, it may be further adjusted by means of the screw 199. The wire 212 is then placed in the machine in the position shown in Figure 2, the screw 240 being adjusted, if necessary, to raise or lower plate 234 so that it will support the wire on a level with the notches 210 and 230. The cap 42 is positioned so that the end of the wire 212 rests against it, as shown in Figure 2. The distance between the flat face 44 of the cap 42 and the knives 202 and 222 determines the length of insulation which is stripped from the wire 212. By loosening the set screw 36, the bar 234 may be slid in or out of the base 10 so as to position the cap 42 at the point where the desired length of insulation will be removed.

At the start of the operation the parts of the machine are in the position shown in Figure 2, the projecting end of the lever 26 being at its forwardmost point of travel. In this position it can be seen that the cam 54 is in position where the projecting portion of the cam 54 lies forward of the bar 80 so that spring 90 is enabled to hold the knife operating arm 66 away from the center of the device, and this knife operating arm, acting through the pin 86, holds the knife 222 away from the knife 202. Also, the movable gripping member 138 is pushed to open position by reason of the fact that the outer end of link 108 is pushed to its forwardmost position, which turns it in a counter-clockwise direction on the pivot 110 and thus turns the gripping member 138 which is keyed to it.

In order to strip the wire, the lever 26 is drawn toward the rear by the handle 98. Some frictional engagement is provided between the plate 124 and the channel into which it slides. For this reason, as the handle is moved to the rear, the screw 102 slides inwardly in the slot 106 and the link 108 turns in a clockwise direction on the pivot 110, carrying the gripping member 138 to closed position, as shown in Figure 3. Due to the sliding action of the pivot 102, the plate 124 is not moved during this phase of the operation.

Sufficient space is provided between the pins 120 and 122 to permit the link 108 to move the operating arm 138 to closed position before the travel of link 108 carries it into contact with the rear pin 120. Substantially at the time the gripping arm 138 reaches closed position the link 108 comes in contact with the rear pin 120, however. During this same movement of the lever the cam member 54 is also turning in a clockwise direction on the pivot 72. As it turns, the side of the projection of the cam 54 pressing against the beveled forward face 84 of the bar 80 forces the bar 80, and with it the knife operating arm 66, toward the center of the device, thus moving the knife 222 through the pin 88 into contact with the knife 202, with the wire 212 between and lying in the slots 210 and 230. As the knives come together the insulation is cut at the point where they meet. Figure 3 shows the device in the position just described.

Further movement of the lever 26 toward the rear presses the link 108 against the pin 120 and moves the plate 124 rearwardly. The gripping members 136 and 138, being mounted on the plate, move with it to pull the wire toward the rear. At the same time the outer face of the projection of the cam member 54 moves from the beveled forward face 84 of the bar 80 to the side thereof and retains the knife 222 in position against the knife 202. The insulation forward of the knives 202 and 222 is thus held in position by the knives while the conductor portion which this insulation surrounds is pulled backwardly along with the rest of the wire 212 by the gripping members 136 and 138. The lever 26 is continued back until all of the bare end of the wire 212 has been drawn through the knife blades and until the handle receiving portion 96 of the lever 26 strikes the side of the device and stops it. By the time the lever 26 reaches this position the wire has been pulled entirely through the knives and the plate 124 has acquired some momentum in a rear direction which causes it to continue in motion.

This continued motion of the plate 124, carrying with it the pivot 110, causes the link 108, and with it the arm 138, to turn on the pivot 110, the outer end of link 108 being unable to move further due to the stopping of the lever 26. The gripping member 138 is thus moved to open position and the stripped wire can be removed, as shown in Figure 4. After removal of the stripped wire 212 the lever 26 is again moved to forward position where the machine is ready to strip another piece of wire.

The arrangement of the link 108 rigid with gripping member 138, having a lost motion connection with lever 26 and pivoting on plate 124 to open and close gripping member 138, serves a purpose in addition to what has been described above. More particularly, by reason of this arrangement, if the movement of the lever 26 toward the rear is interrupted and reversed at any point, the first effect of such reversal is to open the gripping member 138 and release the wire 212. This will take place always before the movement of the plate 124 is reversed since it occurs as lever 26 is moving toward pin 122 with which it must be in contact to move plate 124 forward in the construction shown, which is illustrative, however, and may be varied. One of the outstanding advantages of this feature of operation is that the wire 212 cannot be bent by such reversal as it might be. It is clear, of course, that if the wire were not released from the gripping member 138, forward movement of the plate would tend to push the wire forwardly through the knives 202 and 222 and back inside the partially removed insulation if the latter were resting against cap 42. There is a strong probability, however, particularly if the wire is of rather small diameter, that the wire would bend if so pushed toward the knives instead of passing therethrough and/or that it would be scarred or cut. It is, of course, highly desirable that a wire stripper should neither bend, cut, mar or otherwise damage a wire being stripped.

The fact that gripping member 138 opens when lever 26 is reversed not only has the advantage of preventing injury to the wire but has the additional advantage of permitting shifting of the gripping members 136 and 138 with respect to the wire without removing the wire from the stripper. For example, the lever 26 can be moved rearwardly a sufficient distance to strip a portion of the wire and then the movement of lever 26 can be reversed whereby gripping member 138 will open and, by continuing to move lever 26 forward but preferably not far enough to open knives 202 and 222 (they are open only in the forwardmost position of lever 26), the plate 124 can be moved with respect to wire 212 to bring the gripping members nearer to the partially stripped portion of wire 212 where they can again be caused to grip wire 212 by again reversing lever 26 and moving it rearwardly. This feature, among other things, increases the length of insulation, relative to the distance plate 124 can move with respect to cover 12, that can be removed by the stripper without lifting the wire or opening the knives 202 and 222. In shifting to a new grip on wire 212 as described, it is preferable to avoid moving lever 26 so far forward as to open knives 202 and 222 since these knives, remaining closed, hold the wire in place. If the length of insulation to be removed is unusually long, a portion may be removed as described above and then, after releasing gripping member 138 but without moving lever 26 far enough forward to open knives 202 and 222, the balance of the insulation may be removed by pulling the wire 212 through knives 202 and 222 by hand or by repeating the operation of moving the gripping members 136 and 138 forward along wire 212 to get a new grip thereon.

It is pointed out above that gripping members 136 and 138 are made adjustable, the obvious purpose of the adjustment being to adapt the stripper for use on various sizes of wire. With the adjustable gripping members, pin 120 may be placed so that lever 26 comes in contact with it just as gripping member 138 reaches closed position. This construction has the advantage that the pressure of the gripping members 136 and 138 on the wire during stripping is determined by their adjustment which may be arranged so that the pressure will be of any desired magnitude within reasonable limits.

It is further pointed out above that the spacing of pin 120 from pin 122 may be varied; for example, pin 120 can be set so far away from pin 122 or can be so located that lever 26 will not come into contact with it as gripper 138 reaches closed position. It is also disclosed that pin 120 may be omitted entirely and that the adjustable feature of the gripping members may be omitted. When pin 120 is spaced farther from pin 122 or omitted as described, it is clear that the lever 26 will force plate 124 rearwardly only when and because further pivoting of link 108 and gripping member 138 is arrested by wire 212 so that force exerted by lever 26 on the outer end of link 108, not producing further pivoting, forces the pivot 110 rearwardly carrying plate 124 with it. In this event it is obvious that the gripping pressure will be related to the power of pull on lever 26 necessary to remove the insulation. If the gripping pressure so produced is not undesirable, this construction may be used. It has the decided advantage that adjustment of the gripping members 136 and 138 relative to each other is not necessary to accommodate various sizes of wire.

Thus, for example, it will be appreciated that when the lever 26 is initially shifted to the left from the position shown in Figure 2, it tends to rotate the lever 108 and also the rigidly connected arm 142 about their pivot 110 since of course the frictional resistance to rotation of these two levers or arms with respect to the pivotal mounting on the plate 124 is negligible. In the instant embodiment wherein the pin 120 is omitted, it will be evident that the arms 108 and 142 will continue to turn while the plate 124 remains quiescent until the movable gripping member 138 contacts the stationary gripping member 136 which is rigid with the sliding plate 124, or with what is substantially the same thing, namely the work gripped between the jaws. In other words, the fixed jaw 136 constitutes a member disposed in the path of movement of the movable jaw and rigid with the plate so that further rotation of the movable jaw with respect to its supporting pivot is rendered impossible. From this point on, therefore, movement of the jaws is prevented and the force applied to the lever is resolved in shifting the sliding plate 124 to the left and carrying with it the insulation gripped between the jaws. It will be obvious from the foregoing therefore that the greater the force necessary to move the slide and to pull the insulation from the wire the greater will be the resultant force urging the movable jaw 138 toward the fixed jaw 136. Thus, in accordance with the structure brought out by the broad claims herein, the gripping force is greater as the force required to move the gripping means away from the stripping means becomes greater.

Although one embodiment of the invention has been described in considerable detail herein, it will be understood that the detailed description is not to be construed as a limitation upon the invention. The specific description will make the general principles of construction clear to those skilled in the art so that modifications within its scope will be readily perceived. Thus, for example, although teeth are shown on both gripping members 136 and 138, it is obvious that they may be omitted on one without sacrifice of function. Also, some or all of the adjustments may be omitted, particularly where two or more are provided for the same member. They are preferred for the increased utility they give, but their absence does not render the stripper inoperative.

Suitable materials from which to construct the various parts of the stripper will be apparent to those skilled in the art. Thus, the frame of the stripper may be made of cold rolled steel or may be cast iron or any other desired material. The use of cast iron has the advantage that many of the raised portions on the cover and other associated parts may be cast in one piece, thereby simplifying the construction.

The wire stripper described herein is designed for stripping both heavy and light wire and to withstand constant use. It has the advantage of being capable of withstanding such usage over long periods and being at the same time simple and inexpensive. The absence of any parts moving at high speed minimizes lubrication requirements. Also, since the cutters do not turn with respect to the wire, there is no danger that twisted wire will become untwisted, bent or broken during stripping. The handle operation permits ready return of the device from its final position to its starting position so that there is no necessity for providing resilient means for restoring the device to condition for receiving another wire to be stripped after one has been stripped. Absence of such means avoids the difficulty that the machine in returning to starting position may bend or break the wire already stripped. It will be observed that the stripper operates in a straight line perpendicular to the knives so that it possesses the advantage that the wire is not distorted or bent out of shape by the stripping. All of these advantages are obtained without sacrifice of ease or rapidity of operation. Other advantages will be obvious from the foregoing description.

It is apparent that many widely different embodiments of this invention may be made without departing from the spirit and scope thereof and, therefore, it is not intended to be limited except as indicated in the appended claims.

The invention is hereby claimed as follows:

1. In a wire stripper, the combination including a stripping instrumentality and a gripping instrumentality, a guideway, means movable in the guideway and mounting at least one of said instrumentalities for movement in a path toward and away from the other instrumentality, a control lever, cam means associated with the lever and engaging one of said instrumentalities to actuate same, means operatively connecting the lever to the first named means, said operatively connecting means being associated with the other instrumentality to move the same toward the work in response to movement of the lever whereby said movement of the lever will cause the second instrumentality to move along said path for stripping the wire.

2. In a wire stripper, the combination including a stripping instrumentality and a gripping instrumentality, movable means mounting at least one of said instrumentalities, means for guiding said movable means for movement in a path toward and away from the other instrumentality, a control lever, means associated with said lever engaging one of said instrumentalities to actuate same, means operatively connecting the lever to the first named means, said operatively connecting means being associated with the other instrumentality to move the same toward the work in response to movement of the lever whereby said movement of the lever will cause the second instrumentality to move along said path for stripping the wire.

3. In a wire stripper, the combination including a stripping instrumentality and a gripping instrumentality, a guideway, means movable in the guideway and mounting at least one of said instrumentalities for movement in a path toward and away from the other instrumentality, a control lever, means associated with said lever engaging one of said instrumentalities to actuate same, link means operatively connecting the lever to the first named means, said operatively connecting link means being associated with the other instrumentality to move the same toward the work in response to movement of the lever whereby said movement of the lever will cause the second instrumentality to move along said path for stripping the wire.

4. In a wire stripper, the combination including a stripping instrumentality and a gripping instrumentality, a guideway, means movable in the guideway and mounting at least one of said instrumentalities for movement in a path toward and away from the other instrumentality, a control lever, cam means rigid with the lever and engaging one of said instrumentalities to actuate same, means operatively connecting the lever to the first named means and comprising a link having a lost motion connection with the lever, said operatively connecting means being associated with the other instrumentality to move the same toward the work in response to movement of the lever whereby said movement of the lever will cause the second instrumentality to move along said path for stripping the wire.

5. In a wire stripper, the combination including a stripping instrumentality and a gripping instrumentality, movable means in the guideway and mounting at least one of said instrumentalities, means for guiding said movable means for movement in a path toward and away from the other instrumentality, a control lever, means associated with said lever engaging said stripping instrumentality to actuate same, means operatively connecting the lever to the first named means, said operatively connecting means being associated with the gripping instrumentality to move the same toward the work in response to movement of the lever whereby said movement of the lever will cause the gripping instrumentality to move along said path for stripping the wire.

6. In a wire stripper, the combination including a stripping instrumentality and a gripping instrumentality, a guideway, means movable in the guideway and mounting at least one of said instrumentalities for movement in a path toward and away from the other instrumentality, a control lever, cam means associated with the lever and engaging said stripping instrumentality to actuate same, means operatively connecting the lever to the first named means, said operatively connecting means being associated with the gripping instrumentality to move the same toward the work in response to movement of the lever whereby said movement of the lever will cause the second instrumentality to move along said path for stripping the wire.

7. In a wire stripper, the combination including a stripping instrumentality and a gripping instrumentality, movable means in the guideway and mounting at least one of said instrumentalities, means for guiding said movable means for movement in a path toward and away from the other instrumentality, a control lever, means associated with said lever engaging one of said instrumentalities to actuate same, means operatively connecting the lever to the first named means and comprising a link having a lost motion connection with the lever, said operatively connecting means being associated with the other instrumentality to move the same toward the work in response to movement of the lever whereby said movement of the lever will cause the second instrumentality to move along said path for stripping the wire.

8. In a wire stripper, the combination including a stripping instrumentality and a gripping instrumentality, said gripping instrumentality comprising a shiftable gripping jaw, a guideway, means movable in the guideway and mounting said gripping instrumentality for movement in a path toward and away from the other instrumentality, a control lever, means associated with said lever engaging said stripping instrumentality to actuate same, means operatively connecting the lever to the first named means, said operatively connecting means comprising a link associated with the shiftable gripping member to move the same toward the work in response to movement of the lever whereby the movement of the lever will cause the second instrumentality to move along said path for stripping the wire.

9. In a wire stripper, the combination including a stripping instrumentality and a gripping instrumentality, said gripping instrumentality comprising a fixed gripping jaw and a shiftable gripping jaw, a guideway, means movable in the guideway and mounting said gripping instrumentality for movement in a path toward and away from the stripping instrumentality, a control lever, means associated with said lever engaging said stripping instrumentality to actuate same, link means operatively connecting the lever to the first named means, said link means being associated with the shiftable gripping jaw to move the same toward the work in response to movement of the lever whereby said movement of the lever will cause the second instrumentality to move along said path for stripping the wire.

10. In a wire stripper, the combination including a stripping instrumentality and a gripping instrumentality, said gripping instrumentality comprising a fixed gripping jaw and a pivotally mounted gripping jaw, a guideway, means movable in the guideway and mounting said gripping instrumentality for movement in a path toward and away from the stripping instrumentality, a control lever, means associated with said lever engaging said stripping instrumentality to actuate same, link means operatively connecting the lever to the first named means, said link means being rigid with the pivotally mounted gripping jaw to move the same toward the work in response to movement of the lever whereby said movement of the lever will cause the second instrumentality to move along said path for stripping the wire.

11. In a wire stripper, the combination including a stripping instrumentality and a gripping instrumentality, a guideway, means movable in the guideway and mounting at least one of said instrumentalities for movement in a path toward and away from the other instrumentality, a control lever, means associated with said lever engaging one of said instrumentalities to actuate the same, means operatively connecting the lever to the first named means, said operatively connecting means being associated with the other instrumentality to move the same toward the work in response to movement of the lever, and interengaging stop means on said operatively connecting means and said first named means for positively shifting the second instrumentality along said path for shifting the wire after predetermined movement of said operatively connecting means.

12. A wire stripper as defined in claim 2 including positive stop means associated with said operatively connecting means and said first named means and operative to positively move said first named means in said path after a predetermined shifting movement of said operative connecting means.

13. In a wire stripper, the combination including a stripping instrumentality and a gripping instrumentality, movable means mounting at least one of said instrumentalities, means for guiding said movable means for movement in a path toward and away from the other instrumentality, a control lever, means associated with said lever engaging one of said instrumentalities to actuate same, means operatively connecting the lever to the first named means, said operatively connecting means being associated with the other instrumentality to move the same toward the work in response to movement of the lever, said first named means being provided with means in the path of movement of said operatively connecting means whereby said movement of the lever will cause the second instrumentality to move along said path for stripping the wire.

ROBERT J. MONTGOMERY.